Aug. 31, 1943.  A. SVOBODA  2,328,306
MECHANISM FOR USE IN COMPUTING APPARATUS
Filed June 23, 1942  2 Sheets-Sheet 1
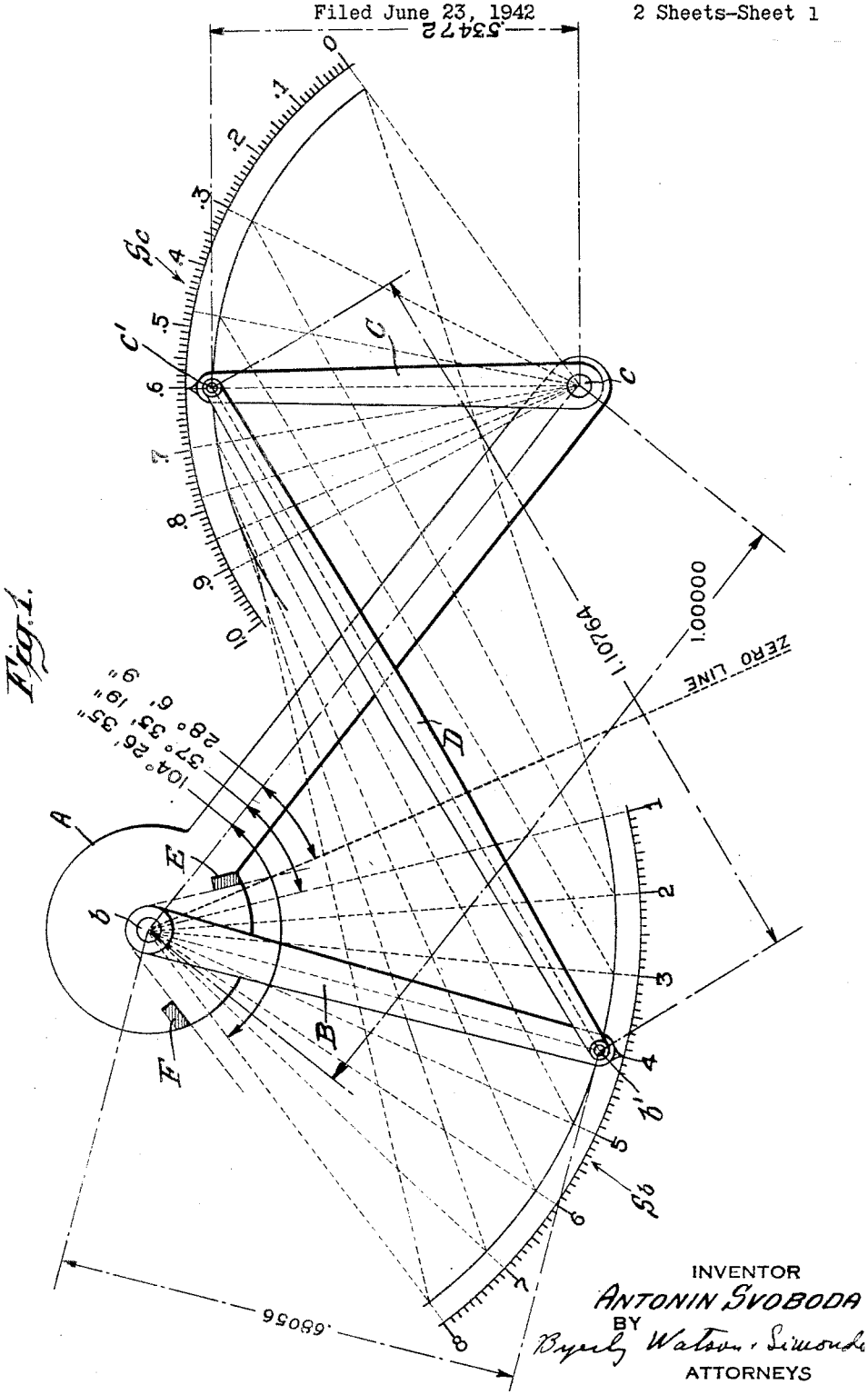
INVENTOR
ANTONIN SVOBODA
BY
Byerly Watson Simonds
ATTORNEYS

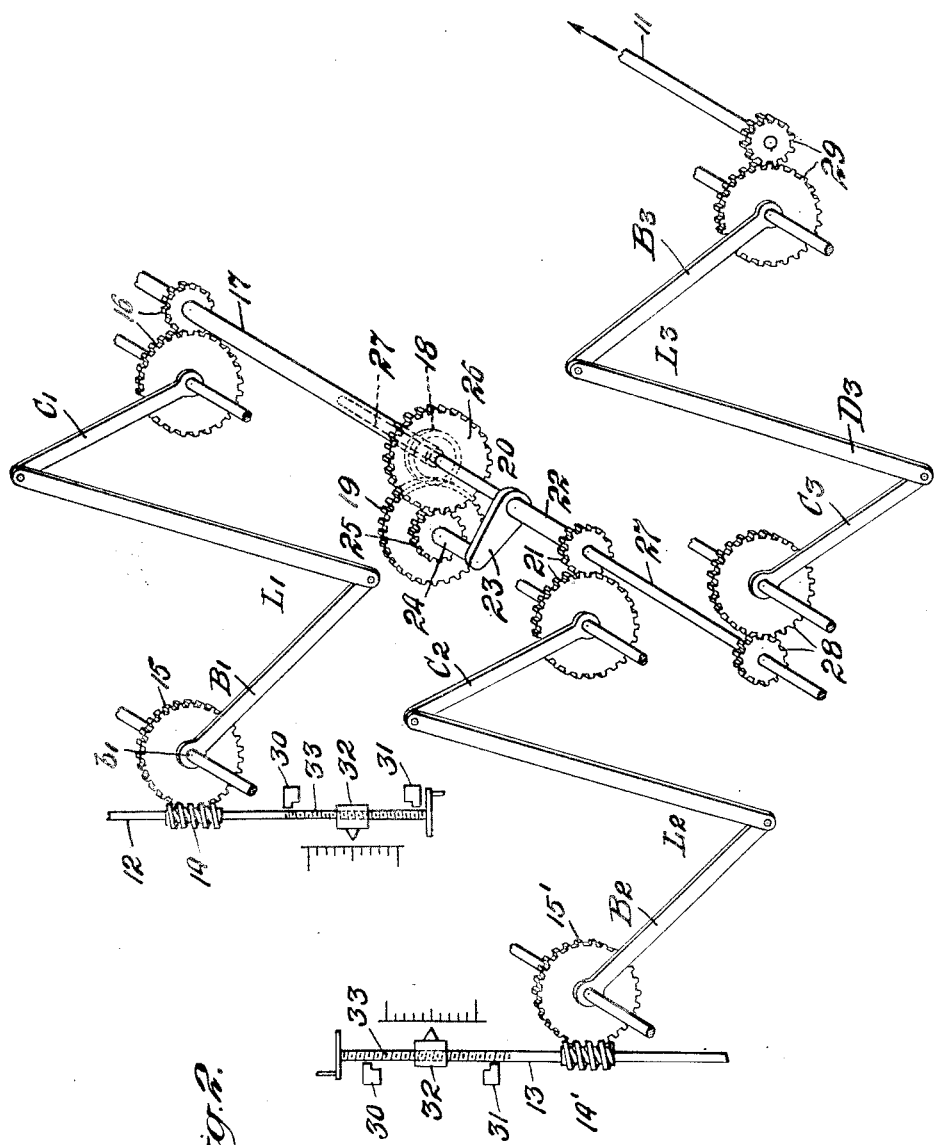

Patented Aug. 31, 1943

2,328,306

UNITED STATES PATENT OFFICE 2,328,306

MECHANISM FOR USE IN COMPUTING APPARATUS

Antonin Svoboda, Forest Hills, N. Y., assignor to Abax Corporation, New York, N. Y., a corporation of New York Application June 23, 1942, Serial No. 448,135

6 Claims. (Cl. 235—61)

This invention relates to a mechanism for use in computing apparatus.

In ballistic and other computing apparatus, it is frequently necessary to provide means for indicating or using the logarithm, the anti-logarithm, or other selected function of a variable. In practice this requires providing a device with two connected movable elements, the relation of whose movements is logarithmic, exponential or some other desired functional relation. Such devices heretofore used have included cams, such as logarithmic or exponential cams. These are very expensive to make with even a fair degree of accuracy.

I have discovered that a movement closely approximating a logarithmic, anti-logarithmic or other monogenic analytic function of another movement may be obtained over a limited but substantial range by means of a linkage in which all the parts have certain critical relative dimensions. A mechanism embodying my invention which is based on this discovery includes a linkage having the required critical relative dimensions, and means, either incorporated in the linkage or connected to it, for limiting the operation of the linkage to the range over which the movements of two of its parts have a relation closely approximating the desired logarithmic, anti-logarithmic or other functional relation.

I have discovered that a movement closely approximating the logarithm of another movement may be obtained over a substantial range by means of a very simple linkage consisting of two pivoted arms connected by a bar, provided that all parts of the linkage have the critical relative dimensions hereinafter specified. Such a linkage can be used to replace logarithmic and exponential cams in ballistic and other computing mechanism, since the relation between the movements of its two arms approximates a true logarithmic relation as closely as the best logarithmic and exponential cams of moderate size. My linkage can be made at a cost very much less than is involved in the making of cams to give results of the same degree of accuracy.

In order that my invention may clearly be understood, I will describe the embodiment of it which is shown in the accompanying drawings in which:

Fig. 1 is a plan view of the linkage mechanism indicating the critical relative dimensions of its parts; and Fig. 2 is a diagrammatic perspective view showing the use of three linkage mechanisms such as that shown in Fig. 1 in an apparatus for obtaining or using the product of two variables.

The linkage device shown in Fig. 1 has a frame or support A which may have any desired form. Two arms B, C are pivoted to the support A on parallel pivots whose axes are at $b$ and $c$. The arms B and C are connected by a bar D connected to the arms by pivots whose axes $b'$, $c'$ are parallel to the pivot axes $b$, $c$. The critical relative dimensions of the parts which are indicated in Fig. 1 are the lengths of the four members A, B, C, D, measured between pivot axes. They are as follows:

Length of frame A ($b$—$c$) _____ 1.0000
Length of arm B ($b$—$b'$) _____ 0.6806
Length of arm C ($c$—$c'$) _____ 0.5347
Length of bar D ($b'$—$c'$) _____ 1.1076

As it is only the relationship between the dimensions which is critical, the length of the frame A has, for convenience, been taken as unity so that the figures set opposite the lengths of the other parts express the relation between these lengths and the length of the frame A.

Means are provided for limiting the range of movement of the movable parts of the linkage. Such means are shown in Fig. 1 as stops E, F formed on the frame A and adapted to engage the arm B. The arm B engages the stop E when its center line $b$—$b'$ makes an angle of 37°35′19″ with the line $b$—$c$ of the frame A. When the arm B engages stop F, its center line $b$—$b'$ makes an angle of 104°26′35″ with the line $b$—$c$ of the frame A.

In order to explain the operation of the mechanism and to indicate to those skilled in the art how it should be connected in computing apparatus, I have shown in Fig. 1 scales $S_b$ and $S_c$ associated with pointers at the free ends of the arms B and C. The scale $S_b$ extends from a zero line, which is at an angle of 28°6′9″ to the line $b$—$c$ of the frame A, to the position of the center line $b$—$b'$ of the arm B when the arm engages the stop F. The graduations of the scale $S_b$ represent angular distances from the zero line. The first graduation is preferably placed at the right-hand limit of the movement of the arm B, but this is not essential. It should be noted, however, that the arm can never move to the zero line.

The scale $S_c$ has its zero point at the position which the arm C occupies when the arm B is at the "1" point of the scale $S_b$. The graduations of the scale $S_c$ are at intervals of 9°, and represent tenths.

The operation of the linkage is indicated by dotted lines which represent eight different positions of the center lines of the movable parts of the linkage. From an examination of Fig. 1, it will be seen that the positions of the arm C on the scale $S_c$ corresponding to the eight positions of the arm B indicated in the drawings are as follows:

| Position of arm B on scale $S_b$ | Position of arm C on scale $S_c$ |
| --- | --- |
| 1 | 0.000 |
| 2 | .301 |
| 3 | .477 |
| 4 | .602 |
| 5 | .699 |
| 6 | .778 |
| 7 | .845 |
| 8 | .903 |

It thus appears from Fig. 1 that in each of the eight positions of the movable parts indicated, the angular distance of the arm C from the zero point of the scale $S_c$ is equal to the logarithm of the angular distance of the arm B from the zero line of the scale $S_b$.

The readings of the position of the arm C are given to three places only, as this is as closely as they can be read on the scale shown in the drawings. The device, however, gives logarithms much more accurately than this. The maximum error of the device in the range of movement permitted by the stops E, F is only three minutes of arc in the position of the arm B, which is only 0.00075 of the range of movement of this arm. This amounts to an error in the position of the arm C on the scale $S_c$ which is proportional to logarithmic intervals along this scale (such as the intervals between the dotted radii indicating different positions of the arm C). The error here is very small, amounting to only 0.001 on the scale $S_c$ at the zero end of the scale where the logarithmic intervals are large and to very much smaller amounts over the rest of the scale.

If the linkage were used outside the limits imposed by the stops E, F, the error would increase rapidly especially beyond the stop E and would soon become so great that the relation of the movements of the two arms would not be recognized as approximating a logarithmic relation.

The small error above specified is inherent in the mechanism and occurs even when the dimensions are exactly equal to the critical values given. Any departure from the critical relative dimensions introduces further errors so that, to obtain the best possible results, the relative dimensions of the linkage should be accurate to the same degree as the best results which can be obtained from the apparatus, that is to say, they should be accurate within 0.00075. In cases where such great accuracy is not required, the relative dimensions may depart somewhat from the critical values given. Thus, for an accuracy of $0°.1$ in the position of the arm B, which is 0.0015 of the range of movement of the arm B, the following tolerances may be allowed in the relative dimensions of the parts of the linkage, the dimensions being given, as before, as ratios to the length of the frame A between the pivots $b$ and $c$:

Arm B ---- $0.68 \pm 0.03$
Arm C ---- $0.53 \pm 0.02$
Bar D ---- $1.11 \pm 0.04$

As previously stated, the scales shown in Fig. 1 have been introduced merely to explain the operation of the apparatus. Actual use of the device in computing apparatus is illustrated in Fig. 2. In reading Fig. 2, it should be understood that all the shafts shown have rotary and thrust bearings in a fixed frame which is not shown in the drawings and which includes the frames of the three linkages shown.

Fig. 2 shows a multiplying apparatus in which an output shaft 11 is rotated in accordance with the product of the rotation of two input shafts 12, 13. The device includes three linkages $L_1$, $L_2$, $L_3$, like the linkage shown in Fig. 1. The input shaft 12 carries a worm gear 14 meshing with the worm gear 15 fixed to the arm $B_1$ of the linkage $L_1$ so as to swing the arm about its pivot $b_1$. The input shaft 13 is similarly connected to the arm $B_2$ of the linkage $L_2$ by worm gearing 14', 15'.

Swinging movements of the arm $C_1$ of the linkage $L_1$ are transmitted through gearing 16 to a hollow shaft 17 which carries a gear 18 meshing with the larger planetary gear 19 of a differential 20. Swinging movements of the arm $C_2$ of the linkage $L_2$ are transferred by gearing 21 to a hollow shaft 22 carrying a crank 23 having a pin 24 on which the larger planetary gear 19 and the smaller planetary gear 25 of the differential 20 are mounted. The sun gear 26 of the differential mounted on a shaft 27 is thus given a movement equal to the sum of the movements of the hollow shafts 17 and 22. Turning of the shaft 27 is transmitted to the arm $C_3$ of the linkage $L_3$ by gearing 28, and the movement which the arm $C_3$ gives to the arm $B_3$ of this linkage through the bar $D_3$ is transferred by gearing 29 to the output shaft 11. The gear ratios of the gearings 16 and 21 are equal. The gear ratio of the gearing 28 is the reciprocal of the gear ratio of the gearings 16 and 21.

In the operation of the device shown in Fig. 2, the differential 20 serves to add two movements proportional respectively to the logarithms of the movements given to the input shafts 12 and 13, and the output shaft 11 is turned in proportion to the anti-logarithm of this sum and, therefore, in proportion to the product of the turning movements of the two input shafts. To specify the operation more exactly, it is necessary to note that the two variables which are multiplied are the angular displacements of the shafts 12 and 13 from zero positions corresponding to the zero lines of the linkages $L_1$, $L_2$, and the product of these two variable quantities is given at all times by the angular displacement of the shaft 11 from a zero position corresponding to the zero line of the linkage $L_3$.

The operation of the three linkages is confined within their ranges of movement. Stops 30, 31 cooperate with nuts 32 engaging worms 33 on the input shafts 12, 13 to limit the movements given to the linkages $L_1$, $L_2$ to ranges of movement so far within their operative ranges that the movements given to the linkage $L_3$ through the gearing and differential are within the range of movement for which the linkage gives accurate results, that is to say, the range of 67° indicated in Fig. 1.

The multiplying apparatus of Fig. 2 has been described merely to illustrate one of the many possible uses of my new mechanism in computing apparatus. In general, it may be used wherever logarithmic or exponential cams have been used in ballistic computing apparatus, and is available for use in making computing apparatus for other purposes for which such apparatus has heretofore not been available because of the expense involved in making accurate cams.

My new mechanism possesses an important advantage over a mechanism containing a cam in that my mechanism may be operated in both directions—to produce a movement proportional to the logarithm of another movement and to produce a movement proportional to the antilogarithm of another movement—without appreciable friction.

What I claim is:

1. A mechanism for use in computing apparatus, comprising a linkage whose parts have such relative dimensions that the relative movement of two parts of the linkage closely approximate a logarithmic relationship over a substantial range of movement, and means for limiting the operation of the linkage to this range of movement.

2. A linkage mechanism for use in computing apparatus, comprising a frame, two pivoted arms and a connecting bar of such relative dimensions that the relative movement of the two arms of the linkage closely approximates a logarithmic relationship over a substantial range of movement, and means for limiting the operation of the linkage to this range of movement.

3. A linkage mechanism for use in computing apparatus, consisting of a frame, two arms pivoted to the frame and extending in opposite directions from the line connecting their pivots, and a bar connecting the arms and pivoted to each of them, in which the lengths of the arms and the bar measured between pivot points bear substantially the following critical relations to the distance between the two pivots on the frame:

Longer arm _____ 0.681
Shorter arm _____ 0.535
Connecting bar _____ 1.108 so that when the longer arm is moved within a range of 67° extending between the positions in which it makes angles of 37½° and 104½° to the line connecting the pivots on the frame, the movement of the shorter arm closely approximates the logarithm of the movement of the longer arm measured from a zero line at an angle of substantially 28°6′ to the line connecting the pivots on the frame.

4. A linkage mechanism for use in computing apparatus, consisting of a frame, two arms pivoted to the frame and extending in opposite directions from the line connecting their pivots, and a bar connecting the arms and pivoted to each of them, in which the lengths of the arms and the bar measured between pivot points bear substantially the following critical relations to the distance between the two pivots on the frame:

Longer arm _____ 0.681
Shorter arm _____ 0.535
Connecting bar _____ 1.108 and means for limiting the movement of the longer arm to a range of 67° extending between the positions in which it makes angles of 37½° and 104½° to the line connecting the pivots on the frame, so that movements of the shorter arm closely approximate logarithms of the movements of the longer arm measured from a zero line at an angle of substantially 28°6′ to the line connecting the pivots on the frame.

5. A linkage mechanism for use in computing apparatus, consisting of a frame, two arms pivoted to the frame and extending in opposite directions from the line connecting their pivots, and a bar connecting the arms and pivoted to each of them, in which the lengths of the arms and the bar measured between pivot points bear the following relations to the distance between the two pivots on the frame:

Longer arm _____ 0.68 ± 0.03
Shorter arm _____ 0.53 ± 0.02
Connecting bar _____ 1.11 ± 0.04 so that the relation between the angular movements of the two arms approximates a logarithmic relation over a range of movement of 67° for the longer arm.

6. A linkage mechanism for use in computing apparatus, consisting of a frame, two arms pivoted to the frame and extending in opposite directions from the line connecting their pivots, and a bar connecting the arms and pivoted to each of them, in which the lengths of the arms and the bar measured between pivot points bear the following relations to the distance between the two pivots on the frame:

Longer arm _____ 0.68 ± 0.03
Shorter arm _____ 0.53 ± 0.02
Connecting bar _____ 1.11 ± 0.04 and means for limiting the turning of the longer arm to a range of 67°, so that the relation between the movements of the two arms approximates a logarithmic relation.

ANTONIN SVOBODA.